(12) United States Patent
Yamamoto et al.

(10) Patent No.: US 8,894,539 B2
(45) Date of Patent: Nov. 25, 2014

(54) WHEEL DRIVING SPEED REDUCER

(71) Applicant: Sumitomo Heavy Industries, Ltd., Tokyo (JP)

(72) Inventors: Akira Yamamoto, Obu (JP); Masayuki Ishizuka, Yokosuka (JP)

(73) Assignee: Sumitomo Heavy Industries, Ltd., Tokoy (JP)

( * ) Notice: Subject to any disclaimer, the term of this patent is extended or adjusted under 35 U.S.C. 154(b) by 182 days.

(21) Appl. No.: 13/645,698

(22) Filed: Oct. 5, 2012

(65) Prior Publication Data

US 2013/0095976 A1    Apr. 18, 2013

(30) Foreign Application Priority Data

Oct. 14, 2011    (JP) .................................. 2011-227157

(51) Int. Cl.
*F16H 57/08*    (2006.01)

(52) U.S. Cl.
USPC .......................................... 475/331; 475/900

(58) Field of Classification Search
CPC ............................. B60K 17/046; B60B 35/125
USPC ................... 180/372; 475/331, 900
See application file for complete search history.

(56) References Cited

U.S. PATENT DOCUMENTS

| | | | |
|---|---|---|---|
| 7,350,606 B2* | 4/2008 | Brill et al. | 180/65.51 |
| 2007/0219043 A1* | 9/2007 | Moon | 475/311 |
| 2009/0277727 A1* | 11/2009 | Ueno | 188/71.5 |
| 2011/0275468 A1* | 11/2011 | Fujimoto et al. | 475/116 |

FOREIGN PATENT DOCUMENTS

| | | |
|---|---|---|
| DE | 1 759 705 A1 | 1/1958 |
| EP | 2 375 106 A1 | 10/2011 |
| WO | 00/36317 A1 | 6/2000 |
| WO | WO00/36317 | 6/2000 |

OTHER PUBLICATIONS

European Search Report application No. 12006996.8 dated Mar. 5, 2013.

* cited by examiner

*Primary Examiner* — Sherry Estremsky
(74) *Attorney, Agent, or Firm* — Squire Patton Boggs (US) LLP

(57) ABSTRACT

A wheel driving speed reducer includes a parallel shaft gear mechanism that includes a parallel shaft gear, a planetary gear mechanism that is provided on a rear stage of the parallel shaft gear mechanism and includes planetary gears and an internal gear with which the planetary gears internally mesh, and a casing that accommodates the parallel shaft gear mechanism and the planetary gear mechanism. A tooth portion of the parallel shaft gear protrudes and extends into a gap, which is formed between the casing and the internal gear or a member integrated with the internal gear, in an axial direction. The tooth portion of the parallel shaft gear and the internal gear or the member integrated with the internal gear overlap each other when seen in a radial direction.

3 Claims, 2 Drawing Sheets

WHEEL DRIVING SPEED REDUCER

BACKGROUND

1. Technical Field

The present invention relates to a speed reducer that is used to drive a wheel of a vehicle.

The present application claims priority on Japanese Patent Application No. 2011-227157 filed on Oct. 14, 2011, the entire contents of which are incorporated herein by reference.

2. Description of the Related Art

A speed reducer, which is used to drive a wheel of a vehicle, is disclosed in International Publication WO 00/36317 (FIG. 1).

This speed reducer includes a parallel shaft gear mechanism that includes a parallel shaft gear, and a planetary gear mechanism that is provided on a rear stage of the parallel shaft gear mechanism and includes planetary gears and an internal gear with which the planetary gears internally mesh. Further, apart of the speed reducer is disposed within a wheel.

SUMMARY

According to an embodiment of the present invention, there is provided a wheel driving speed reducer that includes a parallel shaft gear mechanism, a planetary gear mechanism, and a casing. The parallel shaft gear mechanism includes a parallel shaft gear. The planetary gear mechanism is provided on a rear stage of the parallel shaft gear mechanism and includes planetary gears and an internal gear with which the planetary gears internally mesh. The casing accommodates the parallel shaft gear mechanism and the planetary gear mechanism. A tooth portion of the parallel shaft gear protrudes and extends into a gap, which is formed between the casing and the internal gear or a member integrated with the internal gear, in an axial direction. The tooth portion of the parallel shaft gear and the internal gear or the member integrated with the internal gear overlap each other when seen in the radial direction.

Meanwhile, according to another embodiment of the present invention, there is provided a wheel driving speed reducer that includes a parallel shaft gear mechanism, a brake mechanism, and a casing. The parallel shaft gear mechanism includes a parallel shaft gear. The brake mechanism brakes the rotation of a rotating member of the speed reducer. The casing accommodates the parallel shaft gear mechanism and the brake mechanism. A tooth portion of the parallel shaft gear protrudes and extends into a gap, which is formed between one member of the brake mechanism and the casing, in an axial direction. The tooth portion of the parallel shaft gear and the one member of the brake mechanism overlap each other when seen in the radial direction.

DETAILED DESCRIPTION

In the wheel driving speed reducer that is used while a part of the speed reducer is disposed within a wheel as described above, how to ensure a large transmission capacity while the speed reducer is accommodated in a small space is important.

The sizes of the respective members are basically designed larger for the increase in transmission torque in the wheel driving speed reducer. However, in the case of the speed reducer used to drive a wheel, there are many cases where a spatial margin allowing the size of a member to be increased is not formed not only in the radial direction but also in the axial direction.

It is desired to ensure larger transmission capacity of a wheel driving speed reducer while maintaining the compactness of the overall speed reducer.

In the embodiment of the invention, a gap formed between the casing and the internal gear of the planetary gear mechanism (or a member integrated with the internal gear) is effectively used to maintain the compactness of the overall speed reducer.

That is, the tooth portion of the parallel shaft gear is made to protrude and extend into the gap. Accordingly, the protruding and extending tooth portion of the parallel shaft gear and the internal gear or a member integrated with the internal gear overlap each other when seen in the radial direction.

As a result, it is possible to ensure the large tooth width of the parallel shaft gear and to increase transmission torque while preventing an increase of the weight and size of the overall parallel shaft gear mechanism, that is, while maintaining the compactness of the overall speed reducer.

According to the embodiment of the invention, it is possible to ensure larger transmission capacity of a wheel driving speed reducer while maintaining the compactness of the overall speed reducer.

An example of an embodiment of the invention will be described in detail below with reference to the drawings.

Figure 1:
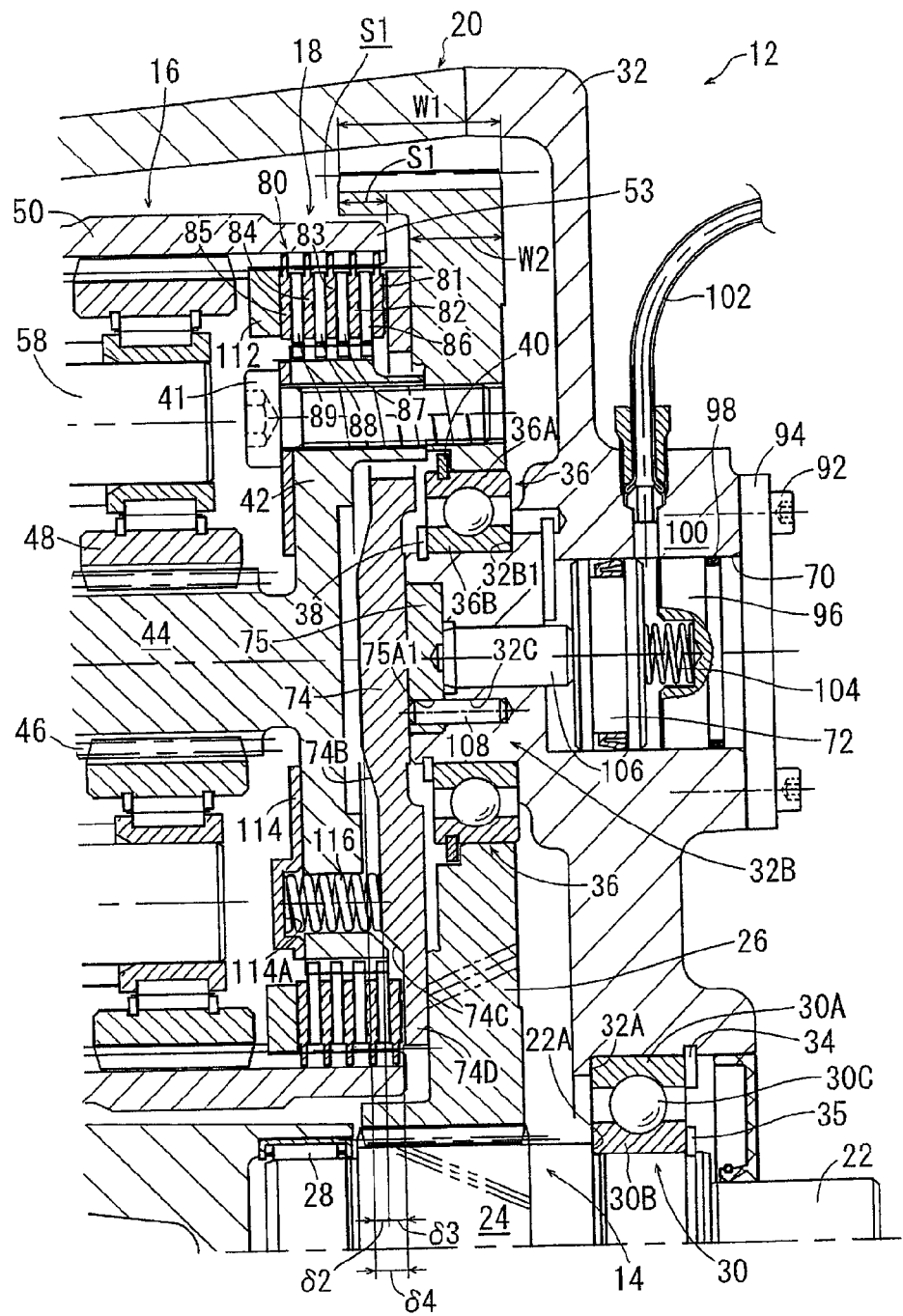
FIG. 1 is an enlarged cross-sectional view of main parts of a wheel driving speed reducer according to an example of an embodiment of the invention.
Figure 2:
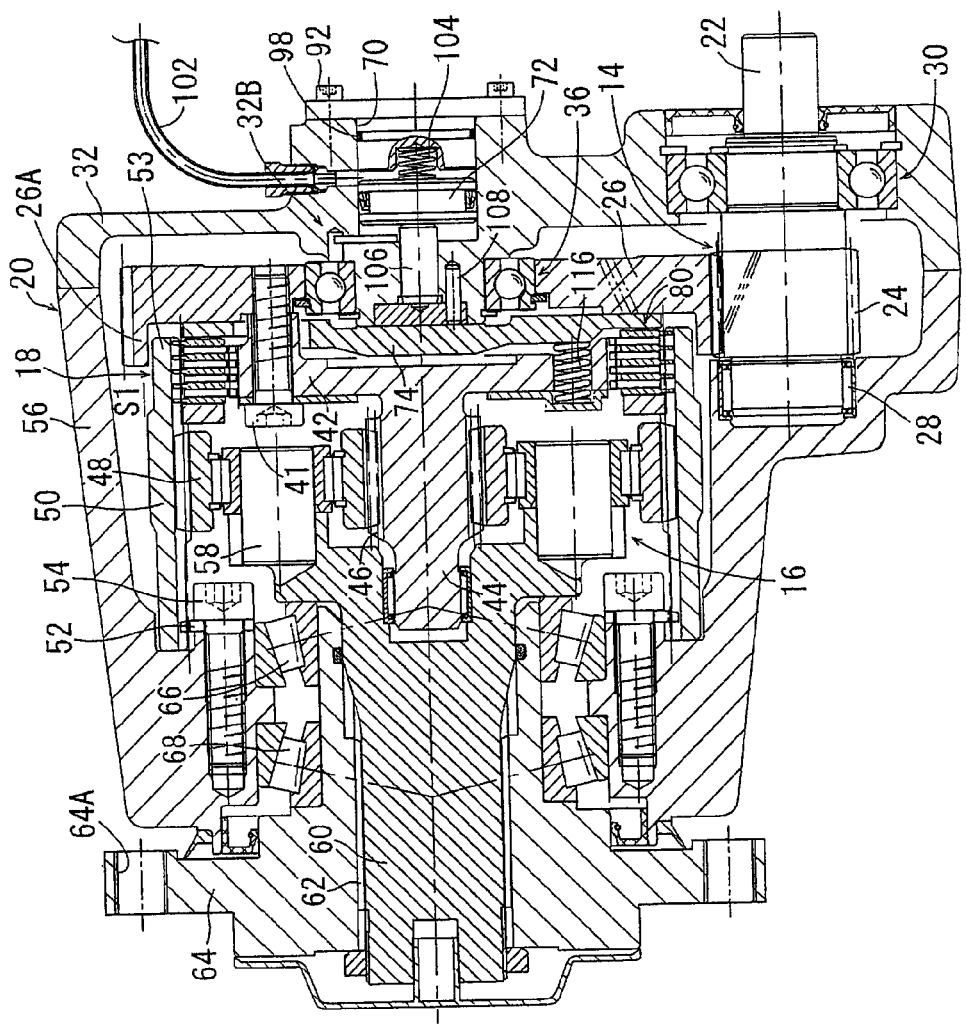
FIG. 2 is a cross-sectional view of the overall speed reducer.

FIG. 1 is an enlarged cross-sectional view of main parts of a wheel driving speed reducer according to an example of an embodiment of the invention, and FIG. 2 is a cross-sectional view of the overall speed reducer.

The speed reducer 12 is to drive a wheel (not shown) of a forklift (vehicle) (not shown). The speed reducer 12 includes a parallel shaft gear mechanism 14, a planetary gear mechanism 16, a brake mechanism 18, and a casing 20 that accommodates these mechanisms, as main elements.

Description will be sequentially made below.

The parallel shaft gear mechanism 14 mainly includes an input shaft 22 that receives power from a motor (not shown), a helical pinion 24 that is formed integrally with the input shaft 22, and a helical gear (parallel shaft gear) 26 that meshes with the helical pinion 24.

Both ends of the input shaft 22 of the parallel shaft gear mechanism 14 are supported on the casing 20 by a needle bearing 28 and a first ball bearing 30. An outer ring 30A of the first ball bearing 30 is fixed to a side cover 32 by being caught between a step 32A that is formed on the side cover 32 forming a part of the casing 20 and a retaining ring 34 that is fitted to the side cover 32.

Further, an inner ring 30B of the first ball bearing 30 is caught between a step 22A that is formed on the input shaft 22 and a retaining ring 35 that is fitted to the input shaft 22. Accordingly, the inner ring 30B restricts the movement of the input shaft 22 in the axial direction of the input shaft. Accordingly, a thrust load, which is applied to the input shaft 22 through the helical pinion 24, is received by the side cover 32 through the inner ring 30B of the first ball bearing 30, the rolling bodies 30C, and the outer ring 30A.

The helical gear 26 is rotatably assembled on a protrusion 32B of the side cover 32 with a second ball bearing 36 interposed therebetween. An inner ring 36B of the second ball bearing 36 comes into contact with a stepped portion 32B1 of the protrusion 32B of the side cover 32, and is fixed to the protrusion 32B of the side cover 32 by a retaining ring 38. An outer ring 36A of the second ball bearing 36 restricts the movement of the helical gear 26 toward the side (left side in FIGS. 1 and 2), which is opposite to a vehicle body, by a retaining ring 40 fitted to the outer ring 36A.

The helical gear 26 is connected to a flange body 42 by bolts 41, and the flange body 42 is integrated with a planetary input shaft 44 of the planetary gear mechanism 16 provided on the rear stage.

The planetary gear mechanism 16 is formed of a so-called simple planetary gear mechanism. The planetary gear mechanism 16 includes a sun gear 46 that is formed integrally with the planetary input shaft 44, planetary gears 48 that revolve around the sun gear 46, and an internal gear 50 with which the planetary gears 48 internally mesh. A ring body 52 is fixed to the side of the internal gear 50 opposite to the vehicle body, and the ring body 52 is fixed to (a casing main body 56 of) the casing 20 by bolts 54. Accordingly, the internal gear 50 is positioned relative to the casing main body 56.

The planetary gear mechanism 16 is adapted to take out power, which is input from the planetary input shaft 44, from an output shaft 60 as the revolution of carrier pins 58 that support the planetary gears 48 with the the internal gear 50 in a fixed state. The output shaft 60 is rotatably supported on the casing 20 with a pair of tapered roller bearings 66 and 68 interposed therebetween. Since splines 62 are formed on the outer periphery of the output shaft 60, an output flange 64 can be rotated integrally with the output shaft 60 by the splines 62. Since wheel mounting holes 64A are formed in the output flange 64, a wheel of a forklift can be mounted on the output flange 64 by stud bolts (not shown).

Meanwhile, in this embodiment, the brake mechanism 18 is disposed between the parallel shaft gear mechanism 14 and the planetary gear mechanism 16. The brake mechanism 18 brakes the rotation of the planetary input shaft (rotating member) 44 of the planetary gear mechanism 16 by braking the flange body (a body to be braked) 42 against a fixed body 53 that is integrated with the internal gear 50.

The brake mechanism 18 includes a piston 72 that slides due to oil pressure in a cylinder 70 formed in the side cover 32, a pressing plate (pressing member) 74 that is driven in the axial direction by the piston 72, and a plurality of friction plates 80 that can generate a friction braking force between the fixed body 53 and the flange body 42 by being pressed by the pressing plate 74.

The brake mechanism 18 will be described in more detail. One end of the cylinder 70, which is formed in the side cover 32, in the axial direction of the cylinder is closed by a plate 94 that is fixed by bolts 92. An end block 96 is disposed at the end portion of the cylinder 70 while coming into contact with the plate 94. A gap between the end block 96 and the inner surface of the cylinder 70 is sealed by an O-ring 98.

A hydraulic chamber 100 is formed between the end block 96 and the piston 72, and oil can flow into and out of the hydraulic chamber 100 through a tube 102. A first spring 104 is provided between the end block 96 and the piston 72 in the hydraulic chamber 100, so that a space (into which oil can flow) of the hydraulic chamber 100 is ensured. The movement of the piston 72 can be transmitted to the pressing plate 74 by a pressing pin 106.

The pressing plate (pressing member) 74 is formed in a disc shape, and can be moved in the axial direction by being pressed to the side opposite to the vehicle body by the pressing pin 106. Reference numeral 108 in FIGS. 1 and 2 denotes a guide pin. The guide pin 108 is fitted to a hole 32C of the side cover 32 and a hole 75A1 of a receiving base 75 integrated with the pressing plate 74, and functions to prevent the rotation of the pressing plate 74 and guide the pressing plate 74 when the pressing plate 74 is moved in the axial direction.

The pressing plate 74 can press the friction plates 80 at thin portions 74D (to be described below), which are formed at the outer peripheral portion of the pressing plate 74, by being moved along the guide pin 108 in the axial direction. In this embodiment, the friction plates 80 include first to fifth stationary friction plates 81 to 85 and first to fourth movable friction plates 86 to 89. The first to fifth stationary friction plates 81 to 85 are fixed to the fixed body 53, which is a member integrated with the internal gear 50, at predetermined intervals in the axial direction. The first to fourth movable friction plates 86 to 89 are inserted and disposed between the first to fifth stationary friction plates 81 to 85. The first to fourth movable friction plates 86 to 89 are fixed to the flange body 42.

The pressing plate 74 can press the first stationary friction plate 81, which is positioned closest to the vehicle body, of the plurality of friction plates 80 to the side opposite to the vehicle body. Further, among the first to fifth stationary friction plates 81 to 85, the fifth stationary friction plate 85, which is positioned closest to the side opposite to the vehicle body, comes into contact with a stop block 112 that is assembled with the fixed body 53. Accordingly, the movement of the fifth stationary friction plate 85 toward the side opposite to the vehicle body in the axial direction is restricted.

Meanwhile, a spring pressing plate 114 is fixed to the surface of the flange body 42 in the axial direction by the bolts 41. The spring pressing plate 114 includes a plurality of recesses 114A on the same circumference, and second springs 116 are partially accommodated in the recesses 114A. The second springs 116 are provided between the pressing plate 74 and the recesses 114A of the spring pressing plate 114. The second springs 116 cooperate with the above-mentioned first spring 104 and retaining ring 40 to position a member group in the axial direction. The member group includes the piston 72, the pressing pin 106, the receiving base 75, the pressing plate 74, the spring pressing plate 114, the planetary input shaft 44 (integrated with the flange body 42) that is fixed together with the spring pressing plate 114 by the bolts 41, and the helical gear 26.

Here, the peripheral configuration of the fixed body 53 of the brake mechanism 18, the internal gear 50 of the planetary gear mechanism 16, and a tooth portion 26A of the helical gear 26 will be described in detail.

The tooth portion 26A of the helical gear 26 protrudes and extends to the side opposite to the vehicle body in the axial direction, and faces a gap S1 formed between the casing 20 and the fixed body 53 (one member of the brake mechanism 18) integrated with the internal gear 50. As a result, the tooth width W1 of the tooth portion 26A of the helical gear 26 is larger than the thickness W2 of a portion of the helical gear 26 except for the tooth portion 26A in the axial direction (W1>W2), and the tooth portion 26A and the fixed body 53 overlap each other by 61 when seen in the radial direction.

Further, the pressing plate (pressing member) 74 of the brake mechanism 18 and the tooth portion 26A of the helical gear 26 also overlap each other when seen in the radial direction (since the pressing plate 74 is completely accommodated within the tooth portion 26A of the helical gear 26 in this example, the pressing plate 74 and the tooth portion 26A completely overlap each other when seen in the radial direction).

Furthermore, in this embodiment, a first step 74B is formed on a part of the surface of the pressing plate 74 in the axial direction. Accordingly, the surface of the pressing plate 74 in the axial direction is close (shifted) to the helical gear 26 by δ2. Further, a second step 74C is formed outside the first step 74B in the radial direction and the thin portions 74D are formed on the outside of the second step 74C in the axial direction. Accordingly, the surface of the pressing plate 74 in the axial direction is closer to the helical gear 26 by δ3. As a result, three plates, that is, the first stationary friction plate 81, the first movable friction plate 86, and the second stationary friction plate 82 (which are a part of the friction plates 80 of the brake mechanism 18) are put in spaces that are ensured on the side of the thin portions 74D opposite to the helical gear and corresponds to δ4 (=δ2+δ3), so that the pressing plate 74 and a part of the friction plates 80 overlap each other by δ4 when seen in the radial direction. Moreover, as described above, the entire pressing plate 74 and the tooth portion 26A of the helical gear 26 completely overlap each other when seen in the radial direction.

Next, the operation of the wheel driving speed reducer 12 will be described.

When the input shaft 22 is rotated by the driving force of a motor (not shown), the helical pinion 24 formed integrally with the input shaft 22 is rotated. When the helical pinion 24 is rotated, the helical gear 26 meshing with the helical pinion 24 is rotated. Accordingly, the flange body 42, which is integrated with the helical gear 26 by the bolts 41, is rotated; the planetary input shaft 44 of the planetary gear mechanism 16, which is integrated with the flange body 42, is rotated; and the sun gear 46 formed on the planetary input shaft 44 is rotated.

Since the internal gear 50 is integrated with the casing 20 and is fixed in the planetary gear mechanism 16, the planetary gears 48 revolve around the sun gear 46 due to the rotation of the sun gear 46 while internally meshing with the internal gear 50. The revolution components of the planetary gears 48 are taken out from the output shaft 60 through the carrier pins 58. When the output shaft 60 is rotated, the output flange 64 is rotated by the splines 62 and a wheel of a forklift (not shown) connected to the output flange 64 is rotated.

Here, in this embodiment, the meshing between the helical pinion 24 and the helical gear 26 is performed by the tooth portion 26A that has a large tooth width W1 and protrudes and extends into the gap S1 formed between the casing 20 and the fixed body 53 (of the brake mechanism 18) that is a member integrated with the internal gear 50.

Specifically, the tooth portion 26A of the helical gear 26 and the fixed body 53 in the axial direction overlap each other by δ1 when seen in the radial direction. This overlapping 61 means that the tooth width W1 of the tooth portion 26A of the helical gear 26 can be increased without an increase in the dimensions of the parallel shaft gear mechanism 14 and the overall speed reducer 12 in the axial direction. That is, by this configuration, it is possible to further increase transmission torque without increasing the dimensions of the overall speed reducer 12 in the axial direction (it is possible to reduce the length of the speed reducer in the axial direction by the amount of overlap if transmission torque is the same).

In particular, (not the combination of a spur pinion and a spur gear but) the combination of the helical pinion 24 and the helical gear 26 is employed in this embodiment to ensure performance, such as low noise and low vibration. In general, if the helical pinion and the tooth portion (meshing portion) of the helical gear have the same specifications when transmission torque is to be increased, a component force at the meshing portion in the axial direction is increased in proportion to the increase in transmission torque. For this reason, for example, the durability of the first and second ball bearings 30 and 36 (particularly, the second ball bearing 36) is apt to deteriorate. The reason for this is that there are many cases where it is particularly difficult to ensure a space in the vicinity of a portion where, particularly, the second ball bearing 36 is disposed and to dispose a bearing having high capacity in the vicinity of the portion where the second ball bearing 36 is disposed as apparent from the disposition of the respective members of this embodiment.

When a load applied to at least the second ball bearing 36 is intended to be reduced through the suppression of the generation of an axial component force caused by helices in order to ensure the durability of the second ball bearing 36 in these circumstances, the helix angle of the helix cannot but be designed small. However, if only the helix angle is designed small without the change of the tooth width, a total meshing ratio is reduced due to the reduction of an overlapping meshing ratio. For this reason, it is not possible to ensure the intended original performance of the helix, such as low noise and low vibration.

However, according to this embodiment, it is possible to maintain the strength of the tooth portion 26A high by ensuring a large tooth width W1 and to maintain the thickness of a portion of the helical gear 26 except for the tooth portion 26A small in the axial direction. Accordingly, it is possible to effectively utilize a space, which is limited in the axial direction, to ensure the thickness of the flange body 42 or the pressing plate 74 in the axial direction, to ensure the dimensions required for the disposition of the second ball bearing 36, and the like. As a result, it is possible to ensure the original performance of the helix (having a large helix angle), such as low noise and low vibration, while maintaining a load applied to the assembled second ball bearing 36 small.

Further, in this embodiment, the shape of the pressing plate (pressing member) 74 is devised and the pressing plate 74 is completely accommodated within the tooth portion 26A. Accordingly, it is also possible to increase the number of the friction plates 80 of the brake mechanism 18 (without increasing the size of a space in the axial direction) according to the increase in transmission torque.

That is, in this embodiment, first, the pressing plate 74 is disposed so that the pressing plate 74 and the tooth portion 26A overlap each other when the pressing plate 74 and the tooth portion 26A are seen in the radial direction. Accordingly, the inner space of the tooth portion 26A in the radial direction is used as a space in which the pressing plate 74 is disposed.

In addition, the first and second steps 74B and 74C are formed on a part of the surface of the pressing plate 74 in the axial direction, so that a part (the first and second stationary friction plates 81 and 82 and the first movable friction plate 86) of the friction plates 80 are put in the spaces ensured on the side of the thin portions 74D opposite to the helical gear. For this reason, a part of the pressing plate 74 and a part of the friction plates 80 overlap each other by δ4 when seen in the radial direction. Accordingly, it is possible to increase the number of the friction plates 80 without increasing the size of the space in the axial direction. As a result, (even when the same pressing force of the same pressing plate 74 is used) it is possible to generate a large braking force between the fixed body 53 and the flange body 42 by the amount of overlap and to obtain braking performance corresponding to the increase in transmission torque.

Meanwhile, in the above-mentioned embodiment, the parallel shaft gear mechanism has employed the combination of the helical pinion and the helical gear. As described above, it can be said that this combination is a combination by which the merits of the invention are obtained at the minimum limits, in that it is possible to improve the durability of a bearing, which is apt to deteriorate in terms of strength, while maintaining low noise and low vibration in addition to ensuring durability at the meshing portion of the parallel shaft gear.

However, in the invention, the combination of the helical pinion and the helical gear does not need to necessarily be employed and, for example, the combination of a spur pinion and a spur gear may be employed. Even when the combination of a spur pinion and a spur gear is employed, it is possible to invariably obtain a merit caused by durability being ensured at the meshing portion and the dimensions of a portion of the parallel shaft gear except that the tooth portion does not need to be increased (a merit caused by the dimensions of other members, such as the flange body, the pressing plate, the bearing, or the like in the axial direction being able to be ensured without an increase in weight).

Further, a simple planetary gear mechanism has been employed as the planetary gear mechanism in the above-mentioned embodiment, but the planetary gear mechanism of the invention is not limited to a simple planetary gear mechanism. For example, a so-called "eccentrically oscillating" planetary gear mechanism, which is formed so that planetary gears internally mesh with an internal gear while oscillating, may be employed. Even in this case, the invention has a merit in that the durability of a parallel shaft gear mechanism does not often relatively deteriorate (it is possible to further reduce the dimension of the speed reducer in the axial direction if the durability of a parallel shaft gear mechanism does not deteriorate).

Furthermore, in the above-mentioned embodiment, the thin portions have been formed by forming the steps on the pressing plate so that a part of the pressing plate (pressing member) and a part of the friction plates of the brake mechanism overlap each other when seen in the radial direction. However, (thin portions are not formed or the thin portions are formed and) recesses may be formed, and the friction plates may be partially put in the recesses.

Moreover, in the above-mentioned embodiment, the brake mechanism has been disposed between the parallel shaft gear mechanism and the planetary gear mechanism and the tooth portion of the parallel shaft gear has protruded and extended into the gap formed between the casing and the fixed body of the brake mechanism that is a member integrated with the internal gear. However, in the invention, the brake mechanism does not need to be necessarily disposed at this position. If the brake mechanism is not disposed at this position, it is possible to obtain the same effect by making the brake mechanism of the parallel shaft gear into the gap between the casing and the internal gear (or a member except for the brake mechanism integrated with the internal gear, for example, a clutch).

Further, even when the brake mechanism is present in the vicinity of the parallel shaft gear, the fixed body of the brake mechanism does not need to be disposed so as to be necessarily integrated with the internal gear. In this case, the tooth portion of the parallel shaft gear may protrude and extend into a gap formed between the casing and a member that forms a part of a brake mechanism (which is disposed separately from the internal gear). Meanwhile, in this case, the rear stage does not need to be necessarily a planetary gear mechanism.

Furthermore, the parallel shaft gear mechanism and the planetary gear mechanism have formed two stages in the above-mentioned embodiment. However, a speed reduction mechanism may be further disposed on the front stage of the parallel shaft gear mechanism or on the rear stage of the planetary gear mechanism.

Moreover, the internal gear and the fixed body have been formed integrally with each other (as a single member) in the above-mentioned embodiment, but may be formed separately and integrated by being fixed to each other by bolts or the like.

Further, in the above-mentioned embodiment, the invention has been applied to a speed reducer that is used to drive a wheel of a forklift. However, the invention may also be widely applied to a speed reducer that is used to drive a wheel, for example, of a construction vehicle, a passenger vehicle, and the like.

It should be understood that the invention is not limited to the above-described embodiment, but may be modified into various forms on the basis of the spirit of the invention. Additionally, the modifications are included in the scope of the invention.

What is claimed is:

1. A wheel driving speed reducer comprising:
   a parallel shaft gear mechanism that includes a parallel shaft gear;
   a planetary gear mechanism that is provided on a rear stage of the parallel shaft gear mechanism and includes planetary gears and an internal gear with which the planetary gears internally mesh; and
   a casing that accommodates the parallel shaft gear mechanism and the planetary gear mechanism,
   wherein a tooth portion of the parallel shaft gear protrudes and extends into a gap, which is formed between the casing and the internal gear or a member integrated with the internal gear, in an axial direction,
   the tooth portion of the parallel shaft gear and the internal gear or the member integrated with the internal gear overlap each other when seen in a radial direction;
   a brake mechanism that brakes the rotation of a rotating member of the speed reducer,
   wherein one member of the brake mechanism is integrated with the internal gear, and
   the tooth portion of the parallel shaft gear and the one member of the brake mechanism overlap each other when seen in the radial direction.

2. The wheel driving speed reducer according to claim 1, wherein the brake mechanism includes a pressing member that can be displaced relative to the one member of the brake mechanism in an axial direction, and
   the pressing member and the tooth portion of the parallel shaft gear also overlap each other when seen in the radial direction.

3. The wheel driving speed reducer according to claim 2, wherein recesses or thin portions are formed on a part of the surface of the pressing member in the axial direction,
   a part of friction plates of the brake mechanism are put in the recesses or the thin portions, and
   a part of the friction plates and a part of the pressing member overlap each other when seen in the radial direction.

* * * * *